Sept. 15, 1959  A. A. BRICKHOUSE, JR  2,904,353
QUICK RELEASE COUPLING
Filed Oct. 14, 1957  2 Sheets-Sheet 1

INVENTOR.
Abner Alexander Brickhouse, Jr.
BY
Adams, Forward and McLean
ATTORNEYS Sept. 15, 1959  A. A. BRICKHOUSE, JR  2,904,353
QUICK RELEASE COUPLING
Filed Oct. 14, 1957  2 Sheets-Sheet 2

INVENTOR.
Abner Alexander Brickhouse, Jr.
BY
Adams, Forward and McLean
ATTORNEYS (# United States Patent Office)

2,904,353
Patented Sept. 15, 1959

2,904,353

QUICK RELEASE COUPLING

Abner A. Brickhouse, Jr., Sidon, Lebanon, assignor to Trans-Arabian Pipe Line Company, New York, N.Y., a corporation of Delaware Application October 14, 1957, Serial No. 690,032

1 Claim. (Cl. 285—33)

My invention relates to fluid conduit connections and in particular provides a quick release coupling.

In some sea-loading installations for oil tankers it has been found desirable to employ a submarine hose connected to the shore installation which is picked up by a tanker moored offshore to provide fluid connection between the tanker and the shore installation. Ordinarily the submarine hose at its offshore end is provided with a plug and is attached to a marker buoy such that after mooring next to the buoy a tanker can pick up the buoy and then draw and secure the submarine hose alongside the vessel, the hose is then unplugged and connected to appropriate conduit fittings on the tanker. A secure coupling uually requires bolting a conduit on the tanker to the end of the submarine hose. Such sealoading operations employing submarine hose have the disadvantage that they cannot be readily uncoupled in emergencies. Thus, for example, should a storm suddenly arise, as not infrequently occurs, the time to uncouple the submarine hose and plug it is on the order of four or five minutes which is frequently longer than is safe for the tanker to remain moored. In order to insure the safety of the tanker and its personnel it sometimes is necessary for the tanker to leave such a sealoading mooring before the submarine hose can be uncoupled. The hose is consequently parted, and substantial loss of oil frequently occurs.

It is therefore a particular object of my invention to provide a hose coupling for connecting a submarine hose to a vessel, such as an oil tanker, which in an emergency can be released rapidly without damage to the hose or vessel.

It is a further object of my invention to provide a coupling for connecting a submarine hose which allows the use of clamps which can be rapidly released in the event of emergency.

It is yet another object of my invention to provide such a submarine hose connection which can be positioned entirely outboard of the vessel such that upon uncoupling of the hose it can rapidly be plugged and dropped.

It is still a further object of my invention to provide such a rapid release coupling requiring a minimum of parts and which is readily installed and released with a minimum of auxiliary equipment.

These and other objects of my invention which will become more apparent hereinafter are essentially obtained by hauling the end of the submarine hose in alongside of the moored vessel with the end of the hose facing upward. The flange on the end of the hose is then connected to the flange on the end of an elbow connected to a hose leading to the vessel's pumping equipment and storage tanks to communicate the vessel's tanks with the shore installation. The flange on the end of the hose and the flange on the end of the elbow are held together by two pairs of longitudinally divided clamps, i.e., split-clamps. One pair of split-clamps are placed facing each other over the flange on the elbow and the other pair of split-clamps are placed facing each other beneath the flange on the end of the hose. The adjacent clamps, which lie on the same side of the hose and elbow, are then bolted or otherwise connected together to clamp together the flanges on the end of the hose and on the end of the elbow. Each of the clamp elements carries a wing member at each end such that in position an adjacent pair of wings extends away from the connection at each end of each confronting pair of clamps. Each such adjacent pair of wings is provided with a confronting pair of slots, one in each wing. The clamps are, moreover, aligned vertically such that their wings are aligned and such that the slots in each upper pair of adjacent wings register vertically with the slots in this corresponding lower pair of wings. Wedges are then freely placed in the upper slots and the gear is then ready for rapid release when necessary. By the simple expedient of driving the wedges downwardly with a sledge hammer, the bolted pairs of clamps are driven away from each other and off the flanges on the elbow and hose. Suitably the hose is then plugged and released overboard. This release operation requires a period of time from 30 to 60 seconds. Ordinarily when a rapid release is not contemplated, the assembly is installed without the wedges, but ready to receive them. In this case the submarine hose and elbow are also held together by a pair of bolts located diametrically opposite each other in the spaces between the split-clamps.

For a more complete understanding of the practical application of the principles of my invention, reference is made to the appended drawings in which.

Figure 1:
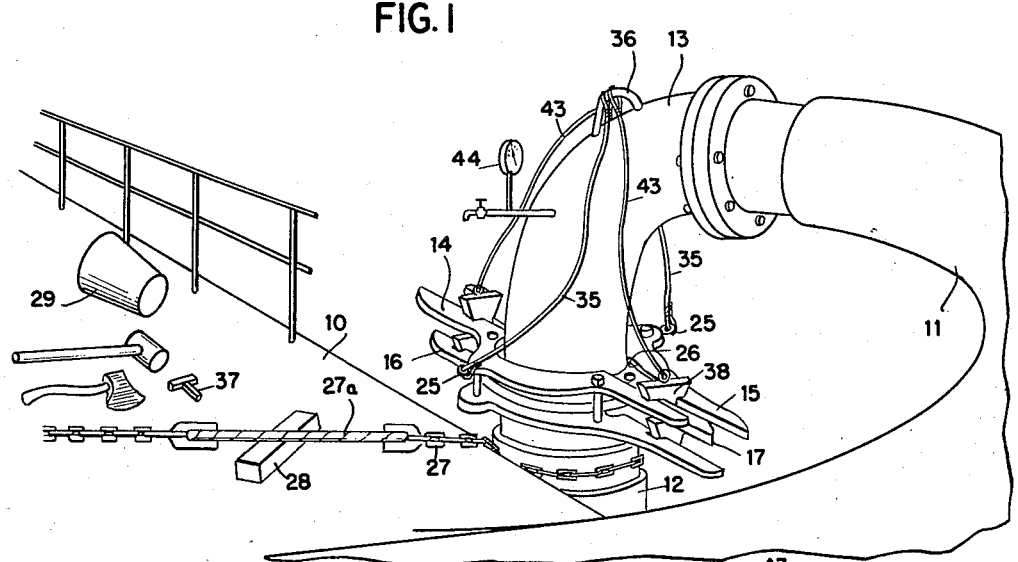
Figure 1 is a perspective view of a coupling constructed in accordance with my invention assembled for quick release.

Referring to the drawings, the reference numeral 10 designates a portion of a tanker or a similar vessel having a deck hose 11 for connection to a submarine hose 12 through an elbow 13 to communicate the tanks in the tanker with a shore installation.

The quick release coupling gear of my invention includes four clamps of identical configuration. It will be noted that two pairs of clamps are positioned confronting each other directly over a second pair of confronting clamps such that one upper and one lower clamp are adjacent to each other and such that the other upper and lower clamps are adjacent to each other. For the sake of clarity, the upper pair of confronting clamps are designated by the reference numerals 14 and 15 and the lower pair of confronting clamps are designated with the reference numerals 16 and 17, with clamps 14 and 16 adjacent to each other, and clamps 15 and 17 adjacent to each other.

Figure 4:
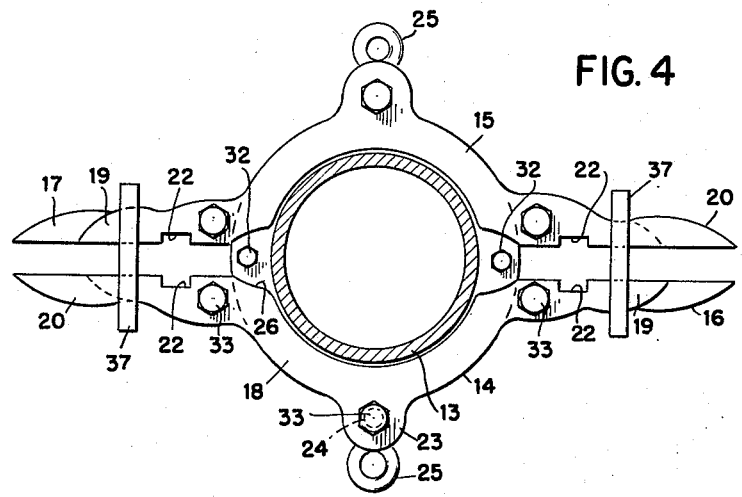
Figure 4 is a plan view of the gear shown in Figures 1, 2 and 3, but assembled for normal usage when quick release is not immediately contemplated.

It will be observed, referring for example to Figure 4, that each clamp consists of a flat arcuate clamping portion 18 from which extends at one end a short wing member 19 and at the other end a long wing member 20. Wing members 19 and 20 are made different lengths for the purpose of facilitating manipulation of the clamps during installation. Each wing member 19 and 20 is provided with a hole 21 located near its base adjacent to clamping portion 18 for receiving a bolt or other fastening device. Each wing is also provided with a vertical slot 22 in its inner edge facing the adjacent wing of the confronting clamp. Slots 22 on each end of clamp are removed an equal distance from the center of curvature of their associated clamping portion 18. Each clamp is also provided with a peripheral boss 23 at the center of its clamping portion which extends away from the center of curvature. Each boss 23 carries a suitable bolt hole 24 and in the case of clamps 14 and 15 also carries outwardly of the clamp an eye ring 25. Each clamp is, moreover, provided at each end of its clamping portion 18 adjacent to the base of each wing 19 and 20, with a cutaway 26.

In assembling the quick release coupling of my invention, a submarine hose 12 is hauled alongside vessel 10 and is secured by a chain 27 to the vessel. Desirably a weak link 27a is inserted in chain 27, for example by inserting a length of twisted canvas in chain 27. Link 27a is then laid over a wooden block 28 resting on the deck of vessel 10. The plug 29 in hose 12 is then removed. Thereafter elbow 13, disconnected from shipboard hose 11, is hoisted by a deck crane into a position with its lower end flange 30 abutting and aligned with the upper end flange 31 on submarine hose 12. With a gasket suitably placed between the abutting flanges 30 and 31, a pair of bolts 32 are placed through a pair of diametrically opposed pairs of vertically aligned bores in flanges 30 and 31 and tightened by nuts in the conventional manner.

One adjacent pair of clamps, for example clamps 14 and 16, are then positioned with the clamping portion 18 of clamp 14 resting over the upper face of flange 30 and of clamp 14 resting over the upper face of flange 30 and with the clamping portion 18 of clamp 16 held just beneath the lower face of flange 31 on hose 12, the heads of bolts 32 being received in cutaway portions 26. Clamps 16 and 14 are during this operation aligned with the long wing 19 on each clamp adjacent to the short wing 20 on the other clamp. Held in this position, clamps 14 and 16 are then secured together by means of bolts 33 and nuts 34, with a bolt 33 extending through both pairs of registering bolt holes 21 and through the pair of registering bolt holes 24. Suitably a short piece of line 35 is secured to eye ring 25 on clamp 14 and to a D-ring 36 fixed to elbow 13. Clamps 15 and 17 are then installed in the same manner on the opposite side of elbow 13 and hose 12 and are secured to D-ring 36 by a piece of line 35 in the identical manner.

Figure 5:
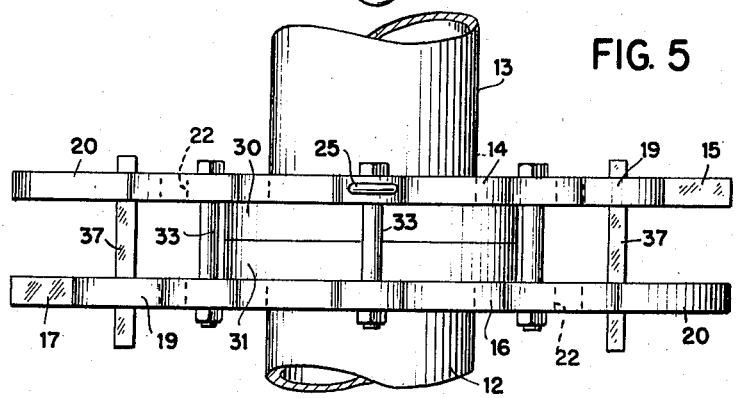
Figure 5 is an elevational view of the coupling assembly of Figure 4.
Figure 6:
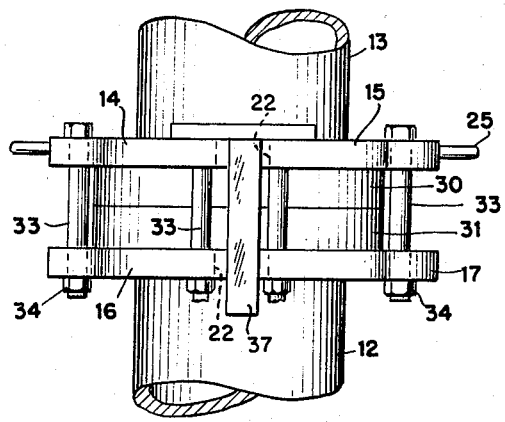
Figure 6 is an end view of the assembly arrangement of Figures 4 and 5.

Referring more particularly to Figures 4, 5 and 6, an adjusting device in the form of a T 37 is placed with its cross-member lying over each adjacent pair of wings 19 and 20 at the opposite ends of clamps 14 and 15 with its long end depending between the adjacent pairs of wings 19 and 20. The secured pairs of clamps 14 and 16 and clamps 15 and 17 are then adjusted toward each other such that T members 37 can just be slid out from between their adjacent wings 19 and 20. In this condition nuts 34 are tightened down to hold clamps 14, 15, 16 and 17 firmly against flanges 30 and 31. Unless quick release is anticipated the coupling is left in this condition; hose 11 is coupled to elbow 13; and fluid communication between the tanker and shore installation is established.

If conditions indicate, however, that an emergency requiring quick release of hose 12 may arise, two wedges 38 are employed. Each wedge 38 includes an upper wedge portion 39 and a lower wedge portion 40 having substantially the same angle of taper. Upper wedge portion 39 and lower wedge portion 40 are joined by a short portion 41 which is substantially narrower than the distance between each adjacent pair of wings 19 and 20, and the distance between the tapers on wedge portions 39 and 40 is just shorter than the distance between adjacent bolted clamps 14 and 16 or clamps 15 and 17. Upper wedge portion 39 carries an eye ring 42 to which is secured the end of a line 43 whose other end is secured to D-ring 36 on elbow 13.

Figure 2:
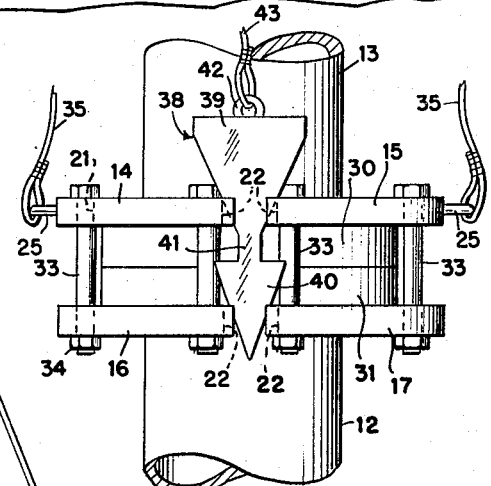
Figure 2 is a fragmentary end view of the coupling shown in Figure 1.

The two wedges 38 are then placed in position. First removing T members 37, and bolts 32, one wedge 38 is slipped with its narrow portion 41 riding in the space between one adjacent pair of wings 19 and 20 on the upper confronting pair of clamps 14 and 15 and with its lower wedge portion extending between the upper and lower pairs of clamps. As the wedge 38 reaches the confronting pairs of slots 22, the upper portion 39 of wedge 38 is allowed to fit into confronting slots 22 in clamps 14 and 15 until it rests there with its lower portion 40 held slightly above the corresponding confronting pair of slots 22 in clamps 16 and 17. The other wedge 38 is then similarly positioned at the opposite side of the gear (see Figures 1 and 2).

Figure 3:
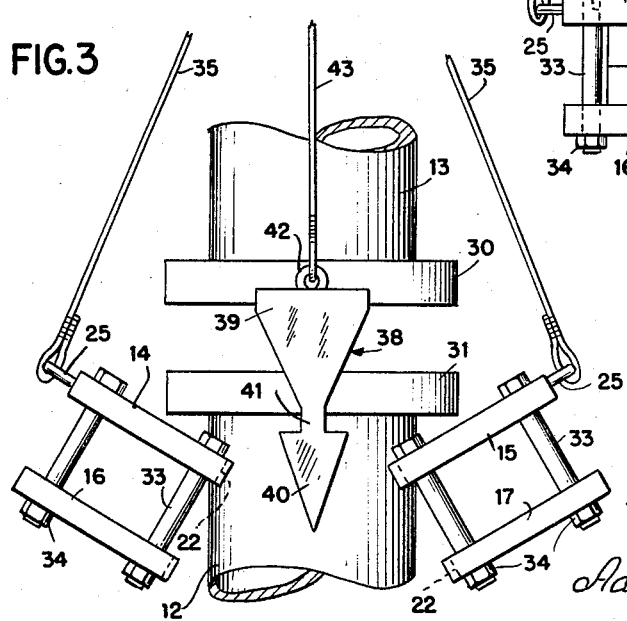
Figure 3 is a view similar to Figure 2, illustrating the quick release action of the coupling.

If an emergency release becomes necessary, with wedges 38 in place, the order is given to cease pumping. When pumping pressure is off, as indicated by a suitable pressure gauge 44 mounted on elbow 13, wedges 38 are struck with a sledge hammer which drives them downwardly, first pushing the adjacent bolted pairs of clamps 14 and 16 and clamps 15 and 17 apart at their upper ends and then, as lower portion 40 of wedge 38 drives into slots 22 in clamps 16 and 17, pushing the lower ends of the confronting bolted clamps apart. These are thereby rapidly released from contact with flanges 30 and 31 on elbow 13 and hose 12, completely disconnecting elbow 13 and hose 12 as seen in Figure 3. If time permits, plug 31 is replaced in the open end of submarine hose 12. Weak link 27a in chain 27 is then struck with an axe where it passes over wooden block 28 to drop hose 12, and the quick release operation is completed.

I claim:

A quick release coupling device for securing abutting flanged ends of a pair of adjacent conduit sections which includes four clamps, each clamp including a curved clamping portion less than 180° and a pair of wings, a said wing extending outwardly from said clamping portion from each end thereof, one pair of said clamps being positioned confronting each other with their clamping portions extending about one of said conduit sections adjacent to the flanged end thereof with the pair of wing members at each end of said one pair of clamps confronting and spaced from each other, the other pair of said clamps being positioned confronting each other with their clamping portions extending about the other of said adjacent conduit sections adjacent to the flanged end thereof with the pair of wing members at each end of said other pair of confronting clamps confronting and spaced from each other and aligned with the wing members of said one pair of confronting clamps, thereby each clamp of said one pair being adjacent to a different clamp of said other pair; means fastening one adjacent pair of clamps together as a unit over said abutting flanges on one side of said adjacent conduit sections; means fastening the other pair of adjacent clamps together over said abutting flanges on the other side of said adjacent conduit sections as a unit separate from said one pair of adjacent clamps, thereby securing said adjacent conduit sections together by separately fastened pairs of adjacent clamps, a slot located in each wing member of each said clamp confronting the corresponding slot in the adjacent wing member of the confronting clamp and aligned with the corresponding slot in the adjacent wing member of the adjacent clamp, and a pair of wedges, one of said wedges being positioned between the confronting slots in one adjacent pair of wing members of said one pair of confronting clamps and the other of said wedges being positioned between the confronting slots in other adjacent pair of wing members of said one pair of confronting clamps, each said wedge including an upper and lower wedge portion having substantially the same angle of taper, the distance between corresponding portions of said upper and lower wedge portions being less than the spacing of said adjacent pairs of clamps.

(References on following page)

References Cited in the file of this patent

UNITED STATES PATENTS

| | | | |
|---|---|---|---|
| Re. 18,906 | McGuirk | Aug. 1, | 1933 |
| 117,980 | Cate | Aug. 15, | 1871 |
| 307,648 | Holland | Nov. 4, | 1884 |
| 401,996 | Brogden | Apr. 23, | 1889 |
| 813,437 | Landau | Feb. 27, | 1906 |
| 1,351,573 | Hopwood | Aug. 31, | 1920 |
| 2,240,078 | Rader | Apr. 29, | 1941 |
| 2,650,115 | Taylor | Aug. 25, | 1953 |

FOREIGN PATENTS

| | | | |
|---|---|---|---|
| 4,374 | Great Britain | Feb. 25, | 1876 |
| 1,066,132 | France | Jan. 20, | 1954 |